March 8, 1949.  W. F. CIOFFI  2,463,518
VEHICLE JACK
Filed Oct. 21, 1946  3 Sheets-Sheet 1
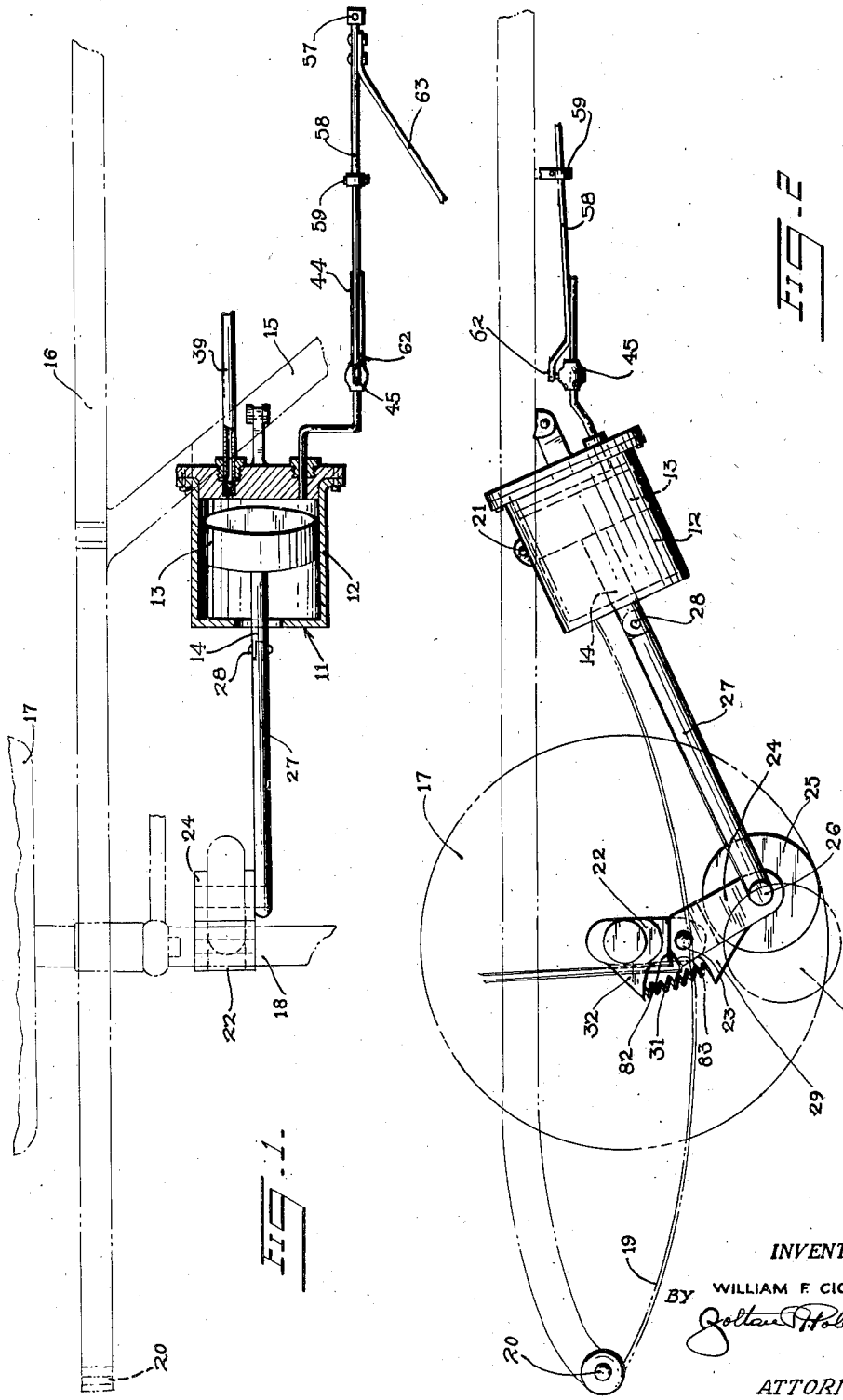
INVENTOR.
WILLIAM F. CIOFFI
BY
ATTORNEY March 8, 1949. W. F. CIOFFI 2,463,518
VEHICLE JACK Filed Oct. 21, 1946 3 Sheets-Sheet 2

INVENTOR.
WILLIAM F. CIOFFI
BY
ATTORNEY

March 8, 1949. W. F. CIOFFI 2,463,518
VEHICLE JACK
Filed Oct. 21, 1946 3 Sheets-Sheet 3
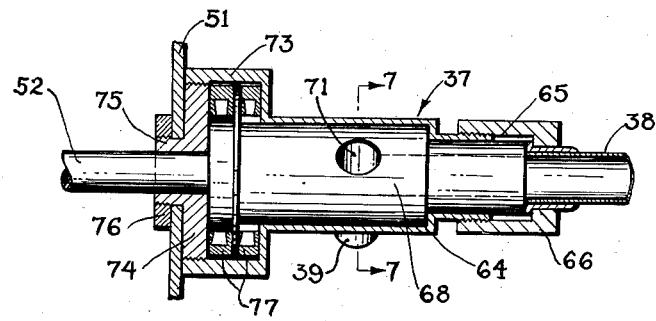
INVENTOR.
WILLIAM F. CIOFFI
BY
*Zoltan Holcsek*
ATTORNEY Patented Mar. 8, 1949

2,463,518

UNITED STATES PATENT OFFICE 2,463,518

VEHICLE JACK

William F. Cioffi, Brooklyn, N. Y.

Application October 21, 1946, Serial No. 704,770

3 Claims. (Cl. 254—86)

1

This invention relates to vehicle jack arrangements of a type to be permanently carried by the vehicle.

It is among the objects of the present invention to provide a selective control arrangement for multiple vehicle jacks which are carried on the vehicle and adapted to be moved by fluid actuators to a position of use where the side of the vehicle is raised and returned to a retracted position when not in use, wherein the pump motor may be arranged to be cut off when any one of the jacks have been operated or when all of the jacks have been operated, this selection being made by a mere movement of an electric switch.

It is another object of the invention to provide a simple arrangement for the operation of the jack and a simple return means for the jack and its operating device, which is incorporated in the jack.

According to the present invention, a jack is provided at each side of the vehicle and with it is an actuator of the fluid type adapted to be operated by suitable fluid control means accessible to the driver of the vehicle at his station in the driver's compartment. Further accessible to the driver, is a selector fluid control device adapted to operate either one or the other of the fluid actuating devices or both of the devices simultaneously. Also accessible to the driver is a switch device for fixing the motor cut-off switch so that it will cut off either when one or the other of the fluid actuating devices has been operated or only when both of the fluid actuating devices has been actuated. Further accessible to the driver is a release valve device for dumping either one or the other of the fluid actuators or both.

The jack structure itself comprises a bracket structure adapted to be attached to the vehicle axle. Pivotally connected to the lower end of the bracket is a jack wheel arm bearing a jack wheel. This arm is connected with a fluid actuator to be moved by the same into a position in vertical alignment with the bracket structure whereby to raise the axle and the side of the vehicle. On both the bracket and the jack wheel arm, there is respectively provided lug portions between which is extended a compression spring for returning the jack wheel arm and its wheel to a retracted position when once the fluid has been released from the actuator.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a fragmentary plan view of a vehicle chassis showing my jack connected to the axle thereof to raise the left rear wheel of the vehicle.

Fig. 2 is an elevational view of the frame and of the jack illustrating its connection with the jack wheel pivoted on the axle structure between a lifting position and a slightly raised position.

Fig. 6 is an enlarged longitudinal cross sectional view of the hydraulic control valve which is mounted upon the vehicle dash board, the section being taken generally along the line 6—6 of Fig. 7 and looking in the direction of the arrows thereof.

Fig. 7 is a transverse cross sectional view of the control valve taken along the line 7—7 of Fig. 6 looking in the direction of the arrows thereof.

Fig. 8 is a front elevational view looking upon the control valve itself as it appears upon the dash board.

Fig. 9 is a wiring diagram for effecting the stoppage of the motor which drives the hydraulic pump at times when one or the other of the actuators at the opposite sides of the vehicle has been extended or at times when only both of the actuators have been extended.

Figure 3:
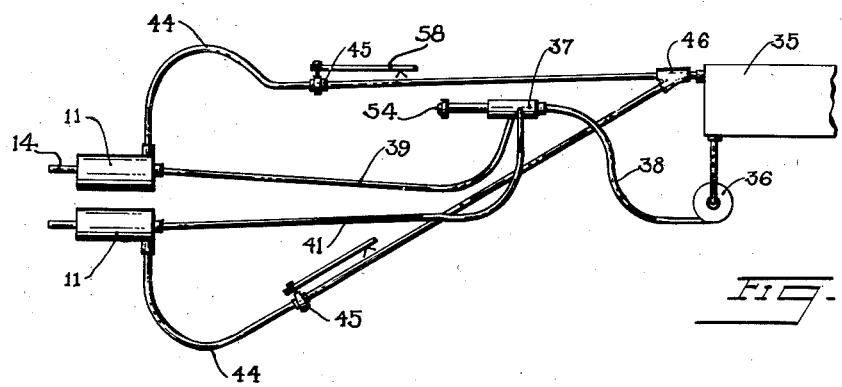
Fig. 3 is a diagrammatical view of the hydraulic system used for selectively feeding fluid to the hydraulic actuators located respectively at opposite sides of the rear axle.

Referring now particularly to Figs. 1 and 2, 11 represents an actuator comprising a cylinder 12 and a piston 13 operable therein and adapted to extend a piston rod 14 through the rear of the cylinder housing 12. The cylinder housing 12 is connected to a chassis piece 15 of a vehicle frame 16.

Connected to the vehicle chassis 16 at the location of a left rear wheel 17 is a rear axle structure 18. This connection is made through a spring 19 anchored at the rear of the chassis 16 as indicated at 20 and forwardly on the chassis 16 at a location adjacent to the connection of the frame piece 15 therewith as indicated at 21 (Fig. 2).

On the axle structure 18 there is connected a bracket 22 to the lower end of which there is pivoted by means of a pivot pin 23, a jack wheel fork or arm 24 containing a supporting wheel 25 on its lower end. This fork has an axle pin 26 for attaching the wheel 25 thereto and which as well serves for the attachment of a connecting rod 27 which pivotally connects at its forward end with the piston rod 14 as indicated at 28 so as to be actuated by the fluid actuator 11. On the fork 24 at the rear thereof is a shelf or lug portion 29 on which rests a compression spring 31 connected at its upper end to a lug portion 32 on the bracket 22. This spring is compressed as the fork 24 is moved rearwardly by the actuator to a position indicated in dotted lines 33 whereby to raise the wheel 17 from the ground. As fluid is drained from the actuator 11, the compression spring 31 will return the fork 24 and wheel 25 to their raised position and at the same time return the piston 13 in the cylinder to a position where it can again be used.

Referring now to Fig. 3, there is shown the hydraulic control system which comprises a fluid supply tank 35 from which fluid is drawn by a pump 36 and delivered to a selector control valve 37 by way of a main pipe 38. The control valve as will be described more in detail later on is of the selector type whereby fluid depending upon the position of the control valve is delivered through either pipe 39 or 41 or through both pipes, which pipes are connected to the cylinders of separate actuators 11, which are of the type just described. Connected with each one of the cylinders is a return pipe 44 which has a release or dump valve 45 therein. These pipes 44 join at a Y-coupling 46 which is connected to the top of the supply tank 35. In each of the cylinder supply pipes 39 and 41 there is a one way intake valve 47 (Fig. 1) which is urged to the closed position as the piston 13 is returned to force the fluid through the return pipes 44.

Figure 4:
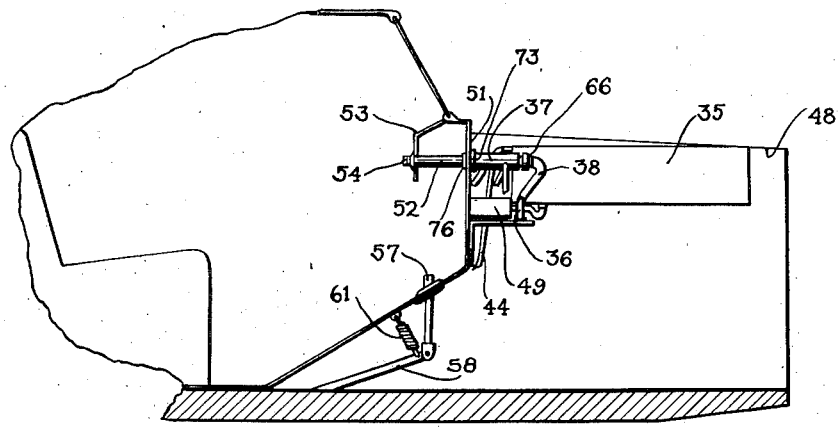
Fig. 4 is a diagrammatical view showing the control devices in the driver's compartment.
Figure 5:
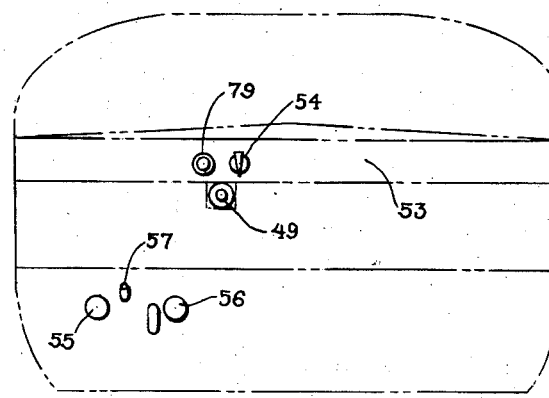
Fig. 5 is a diagrammatical view looking directly upon the vehicle control panel and foot board to show the location of the respective controls for the system with relation to the usual vehicle controls.

Referring now particularly to Figs. 4 and 5, the arrangement of the control valves in the driver's compartment will be described. The tank 35 is located under a hood 48 of the vehicle and as well there is similarly located thereunder the pump 36 and an electric driving motor 49 for the pump. The control valve 37 is mounted on a dashboard 51 and has a shaft 52 which extends rearwardly for rotation in a front dash panel 53. The shaft 52 has the knob 54 thereon adapted to be turned to the right or left depending upon which jack is to be lowered.

On the foot board adjacent clutch and brake pedals 55 and 56 is an actuator button 57 for operating the release valves 45 to permit the return of the actuator pistons. As this button moves downwardly, an arm 58 is pivoted to a bracket 59 mounted somewhere on the vehicle chassis and against the action of a return spring 61 connected between the foot board and the forward end of the arm. This arm 58 has an end portion 62 connected to the release valve 45 to operate the same. On the forward end of the arm 58 there is a second arm 63 rigid therewith and arranged to simultaneously operate the release valve for the other actuator (Fig. 1). Thus to lower the jack the control handle 54 is positioned. Thereafter when it is desired to raise the jack the button 57 is depressed.

Referring now to Figs. 6, 7 and 8, the selector valve 37 comprises an outer sleeve 64 externally threaded on a reduced portion 65 to which the main delivery pipe 38 is connected by a coupling member 66. Within the sleeve 64 is a two-way valve element 67 adapted to be turned either to the right or to the left by the control handle 54 on the front panel.

If the valve element 67 is turned to the right fluid entering a central passage 68 thereof will be directed through way 71 to the pipe 41 and thence to the cylinder 43 at the right side of the vehicle (Fig. 3). If the valve element 67 is turned to the left, fluid from the main central passage 68 passes through way 72 which will register with pipe 39 and be directed to the cylinder of the actuator 11 at the left side of the vehicle (Fig. 3). If the valve element 67 is turned to a position inverted from the way it is shown in Fig. 7 and so that the ways 71 and 72 are respectively connected with pipes 39 and 41, both actuators will be simultaneously actuated.

The portion of the sleeve 64 adjacent to the dash board 51 is expanded as shown at 73 and internally threaded to receive a combined closure and mounting element 74 having a portion 75 extending through the dash board 51 and secured thereto by a locking nut 76. Washer elements 77 serve to prevent leakage of fluid through the enlarged portion 73 of the sleeve.

Referring now particularly to Figs. 2 and 9, there is shown the electrical control system for the fluid pump 36 driven by the motor 49. Motor 49 receives its power from the vehicle generator 78 when a main switch 79 is thrown to a position at the left in engagement with contacts 80 such that the motor will be automatically stopped when either wheel 25 is lowered to raise the particular side of the vehicle or when thrown to the right in engagement with contacts 81 whereby the motor will be stopped only when both jacks have been extended to raise the entire end of the vehicle. The switch 79 is located on the front panel 53 (Fig. 5) and can be turned to any one of three positions to the left or right or moved to a neutral or out of engagement position. The switch is one of the three pole double throw type and as actually used on the panel 53 is operated by rotational movement and such that the contacts can be mounted on a drum.

Associated with each of the brackets 22 (Fig. 2) are contact elements 82 and on each of the jack wheel forks 24 is a contact 83. As the fork 24 is brought to the vertical position under the bracket 22 to raise the particular side of the car, the contacts 82 and 83 engage one another to close a circuit which will operate a solenoid 84 of a cut-off switch 85 to break the motor circuit and stop the pump. With the switch 79 thrown to the left and into engagement with the contacts 80, the two pairs of switch contacts 82 and 83 with the respective jack wheels at the opposite sides of the vehicle are placed in a parallel or shunt relationship in the solenoid circuit. Either one of the pairs of contacts can be closed and the switch 85 will be opened to stop the motor 49, all of which depending upon which jack wheel is being lowered.

If the switch 79 is moved to the right to engage contacts 81, both pairs of contacts 82 and 83 are placed in a series relationship with one another and in the solenoid circuit thereby requiring that each pair of contacts will be closed before the solenoid opens the cut-off switch for the discontinuation of the motor 49. Thus both jack wheels have to be lowered before the motor 49 is stopped.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A vehicle jack arrangement comprising a fluid actuator adapted to be anchored to the frame of the vehicle, a bracket structure adapted to be connected to an axle and having a lug portion extending longitudinally therefrom, a jack wheel and an arm pivoted to the lower end of the bracket structure and adapted to be positioned in a vertical location beneath the axle structure, whereby to raise one side of the vehicle, a connecting rod extending between the lower end of the wheel arm and the fluid actuator whereby to effect the movement of the wheel arm by the actuator, fluid control mechanism adapted to be operated from the driver's compartment of the vehicle to cause the extension of the actuator, said wheel arm having a lug portion thereon adapted to be aligned with the lug portion of the bracket when the jack wheel is moved to its operative position, a compression spring extending between said lug portions and operative to effect movement of the wheel arm to its inoperative position when the actuator has been released, release mechanism for the actuator to permit the retraction of the jack wheel under the action of the compression spring, said control mechanism for the actuator including an electric motor and a pump driven thereby, a source of current supply and a solenoid operated cut-off switch for the motor, contacts located respectively on the bracket structure and jack wheel arm adapted to be placed in engagement with one another as the wheel arm is placed into vertical alignment with the axle bracket structure to raise the vehicle and circuit wires extending between the contacts and the solenoid to effect the operation of its contacts and the opening of the motor circuit.

2. A vehicle jack arrangement comprising a plurality of fluid actuators connected to the vehicle at different locations thereon, bracket structures adapted for connection with a vehicle axle, one of said bracket structures being located at each side of a vehicle axle, a jack wheel and an arm therefor pivoted to the lower end of each bracket structure, a connection established between each arm and the actuator whereby as the actuator is extended the jack wheel arm is placed in vertical alignment with the bracket structure to raise the axle and the side of the vehicle body, a fluid mechanism for delivering fluid to the actuators including a selector control device for delivering fluid to one or the other of the actuators, an electrically driven motor adapted to operate a fluid pump for placing the fluid under pressure, a pair of contacts adapted to be closed by each actuator when the stroke of the same has been completed, said contacts forming a part of a solenoid cutoff device for the motor and a switching device for placing the pairs of contacts either in parallel relationship with a current supply to effect the opening of the motor circuit when either one of the actuators has been operated or moved to another position to place the contacts operated by the actuators in series relationship to cut off the motor circuit only when both of the actuators have been actuated.

3. A vehicle jack arrangement comprising a plurality of fluid actuators connected to the vehicle at different locations thereon, bracket structures adapted for connection with a vehicle axle, one of said bracket structures being located at each side of a vehicle axle, a jack wheel and an arm therefor pivoted to the lower end of each bracket structure, a connection established between each arm and the actuator whereby as the actuator is extended the jack wheel arm is placed in vertical alignment with the bracket structure to raise the axle and the side of the vehicle body, a fluid mechanism for delivering fluid to the actuators including a selector control device for delivering fluid to one or the other of the actuators, an electrically driven motor adapted to operate a fluid pump for placing the fluid under pressure, a pair of contacts adapted to be closed by each actuator when the stroke of the same has been completed, said contacts forming a part of a solenoid cut-off device for the motor, a switching device for placing the pairs of contacts either in parallel relationship with a current supply to effect the opening of the motor circuit when either one of the actuators has been operated or moved to another position to place the contacts operated by the actuators in series relationship to cut off the motor circuit only when both of the actuators have been actuated, a manually operated fluid release device for conditioning the fluid actuators so that their operating elements can be returned to their retracted positions and a return spring connected between the bracket structure and the jack wheel arm for returning the jack wheel and its arm to their returned position when the fluid has been released from the actuators.

WILLIAM F. CIOFFI.

REFERENCES CITED

The following references are of record in the file of this patent:

UNITED STATES PATENTS

| Number | Name | Date |
| --- | --- | --- |
| 2,001,411 | Davis | May 14, 1935 |
| 2,048,264 | Harris | July 21, 1936 |
| 2,146,955 | Helms et al. | Feb. 14, 1939 |